US012191577B2

(12) United States Patent
Mizuno et al.

(10) Patent No.: US 12,191,577 B2
(45) Date of Patent: Jan. 7, 2025

(54) ANTENNA DEVICE

(71) Applicant: YOKOWO CO., LTD., Tokyo (JP)

(72) Inventors: Hirotoshi Mizuno, Tomioka (JP); Yusuke Yokota, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 17/962,551

(22) Filed: Oct. 10, 2022

(65) Prior Publication Data

US 2023/0032648 A1 Feb. 2, 2023

Related U.S. Application Data

(63) Continuation of application No. 16/498,426, filed as application No. PCT/JP2018/011291 on Mar. 22, 2018, now Pat. No. 11,502,409.

(30) Foreign Application Priority Data

Mar. 29, 2017 (JP) ................................ 2017-066279

(51) Int. Cl.
*H01Q 1/32* (2006.01)
*H01Q 1/48* (2006.01)
*H01Q 5/307* (2015.01)
*H01Q 9/04* (2006.01)

(52) U.S. Cl.
CPC ........... *H01Q 5/307* (2015.01); *H01Q 1/3275* (2013.01); *H01Q 1/48* (2013.01); *H01Q 9/0407* (2013.01)

(58) Field of Classification Search
CPC ..... H01Q 1/24–50; H01Q 5/30; H01Q 9/0407
See application file for complete search history.

(56) References Cited

U.S. PATENT DOCUMENTS 5,808,586 A 9/1998 Phillips et al.
8,976,070 B2 3/2015 Kang et al.
9,837,720 B2 * 12/2017 Ryu .................... H01Q 9/0442
(Continued)

FOREIGN PATENT DOCUMENTS

CN 1472843 A 2/2004
CN 106252892 A 12/2016
(Continued)

OTHER PUBLICATIONS

International Search Report and Written Opinion mailed on May 29, 2018 for PCT/JP2018/011291 filed on Mar. 22, 2018, 8 pages.
(Continued)

*Primary Examiner* — Hasan Islam
(74) *Attorney, Agent, or Firm* — XSENSUS LLP

(57) ABSTRACT

An antenna device includes an antenna housing and an antenna element. The antenna element is accommodated in the antenna housing and receives signals in a first frequency band and a second frequency band which is lower than the first frequency band. The antenna element includes a first element that receives signals in the first frequency band and a second element that surrounds the first element and receives signals in the second frequency band. The first element includes a conductive plate which has a predetermined area, the second element includes a conductive plate which has a predetermined area, and the conductive plates are provided in an identical plane or a substantially identical plane.

11 Claims, 16 Drawing Sheets

(56) References Cited

U.S. PATENT DOCUMENTS

| | | | | |
|---|---|---|---|---|
| 9,866,195 | B2 * | 1/2018 | Nagumo | H03H 7/40 |
| 10,879,590 | B2 * | 12/2020 | Li | H01Q 5/335 |
| 11,271,314 | B2 | 3/2022 | Ishizuka | |
| 2003/0028095 | A1 | 2/2003 | Tulley et al. | |
| 2004/0061652 | A1 | 4/2004 | Ishihara et al. | |
| 2006/0097918 | A1 | 5/2006 | Oshiyama et al. | |
| 2012/0050120 | A1 | 3/2012 | Lindenmeier et al. | |
| 2013/0249767 | A1 | 9/2013 | Ishizuka et al. | |
| 2014/0028512 | A1 | 1/2014 | Lindenmeier et al. | |
| 2014/0266964 | A1 | 9/2014 | Kato et al. | |
| 2015/0116168 | A1 * | 4/2015 | Yosui | H01Q 5/328 343/722 |
| 2018/0261913 | A1 | 9/2018 | Imamura et al. | |

FOREIGN PATENT DOCUMENTS

| | | | |
|---|---|---|---|
| EP | 0863570 | A2 | 9/1998 |
| EP | 1306924 | A2 | 5/2003 |
| FR | 2498819 | A1 | 7/1982 |
| JP | 10-242731 | A | 9/1998 |
| JP | 2004-88198 | A | 3/2004 |
| JP | 2007-116739 | A | 5/2007 |
| JP | 2012-161075 | A | 8/2012 |
| JP | 2013-106146 | A | 5/2013 |
| JP | 2014-232981 | A | 12/2014 |
| JP | 2015-70408 | A | 4/2015 |
| JP | 2015-133692 | A | 7/2015 |
| JP | 2017046142 | A | 3/2017 |
| KR | 2016-0108999 | A | 9/2016 |
| WO | 00/76023 | A1 | 12/2000 |
| WO | 2010/093131 | A2 | 8/2010 |
| WO | 2013/038875 | A1 | 3/2013 |

OTHER PUBLICATIONS

Office Action issued on Sep. 28, 2020, in corresponding Chinese patent Application No. 201880020795.9, 13 pages.

Extended European search report issued on Dec. 2, 2020, in corresponding European patent Application No. 18777956.6, 11 pages.

Chinese Office Action issued May 18, 2021, in corresponding Chinese Patent Application No. 201880020795.9.

Information Statement issued on Nov. 2, 2021, in corresponding Japanese patent Application No. 2017-066279, 11 pages.

Office Action issued on Nov. 30, 2021, in corresponding Japanese patent Application No. 2017-066279, 12 pages.

Notice of Reasons for Refusal mailed Jan. 30, 2024, in Japanese Application No. 2023-016892, 10 pages.(with translation).

* cited by examiner

ANTENNA DEVICE

CROSS-REFERENCE TO RELATED APPLICATIONS

The present application is a continuation of U.S. application Ser. No. 16/498,426, filed Sep. 27, 2019, which is based on PCT filing PCT/JP2018/011291, filed Mar. 22, 2018, which claims priority to JP 2017-066279, filed Mar. 29, 2017, the entire contents of each are incorporated herein by reference.

FIELD OF THE INVENTION

The present invention relates to a low-profile antenna device capable of being attached to, for example, a vehicle body.

DESCRIPTION OF THE RELATED ART

Examples of FM/AM band antenna device capable of being attached to a vehicle body include antenna devices disclosed in Japanese Patent Laid-Open No. 2012-161075 and Japanese Patent Laid-Open No. 2013-106146. In the antenna device disclosed in Japanese Patent Laid-Open No. 2012-161075, an antenna base and an antenna element composed of two types of helical portions are accommodated in a shark fin shaped antenna case. The two types of helical portions are a first helical portion positioned close to the antenna base and a second helical portion positioned away from the antenna base. The first helical portion is formed by a line pattern or a conductive plate member. In contrast, the surface area per unit length of the second helical portion is larger than that of the first helical portion and the second helical portion is formed by a line-like pattern, a solid pattern, a solid pattern and a wire, a conductive plate member folded in a substantially U-shape (a horizontally long helical-shaped element).

In the antenna device disclosed in Japanese Patent Laid-Open No. 2013-106146, an antenna element is formed by a helical antenna component and a plate component. The antenna component is wound around an imaginary axis extending in a direction from an antenna base to the top portion of the antenna device for a vehicle. The plate component is a conductive plate and positioned at an open end of the helical antenna component to cover the top portion in an electrically connected state and in a positional relationship in which the plate component is intersected by the imaginary axis at a perpendicular or tilted angle.

The main purpose of the antenna device disclosed in Japanese Patent Laid-Open No. 2012-161075 is to have the entire antenna element function efficiently in a limited space. However, in such an antenna device, the two types of helical portions are arranged in a height direction with a fixed spacing.

In particular, in the case in which the second helical portion is formed by a conductive plate member, the second helical portion is positioned to keep the surface upright with respect to the antenna base, that is, positioned to form a vertically mounted structure. For this reason, there is a limitation to low-profile design and the achievable height is up to about 70 mm.

The antenna device disclosed in Japanese Patent Laid-Open No. 2013-106146 can, in spite of its low-profile design, achieve almost constant antenna gain across a wide bandwidth due to the effects of the plate component attached to the end of the antenna component. However, since this antenna device is formed by a single antenna component and a single plate component, there is a limitation to achieving high antenna gain. In addition, it is supposed that the achievable antenna height in low-profile design is about 50 mm to 70 mm.

The present invention has been made in view of the aforementioned problems and an object of the present invention is to provide an antenna device with a configuration that enables maintaining antenna performance determined by antenna gain and other factors at the same level as those of conventional antenna devices when the height of the antenna device is determined to be 50 mm or less for low-profile design.

SUMMARY OF THE INVENTION

According to the present disclosure, an antenna device includes an antenna housing and an antenna element that is accommodated in the antenna housing and receives signals in a first frequency band and a second frequency band which is lower than the first frequency band, wherein the antenna element includes a first element that receives signals in the first frequency band and a second element that surrounds the first element and receives signals in the second frequency band. The first element includes a conductive plate which has a predetermined area, wherein the second element includes a conductive plate which has a predetermined area, and wherein the conductive plates are provided in an identical plane or a substantially identical plane.

Further features of the present invention will become apparent from the following description of exemplary embodiments (with reference to the attached drawings).

DESCRIPTION OF EMBODIMENTS

First Embodiment

In a first embodiment, the case in which the present invention is applied to a low-profile antenna device that is operable in the VHF band, such as the FM band (76 MHz to 90 MHz), and the MF band, such as the AM band (0.520 MHz to 1.710 MHz), is described. This antenna device is configured such that an antenna case, which is an example of an antenna housing, accommodates an antenna element and used in the state in which this antenna device is attached to, for example, a vehicle roof.

Figure 1:
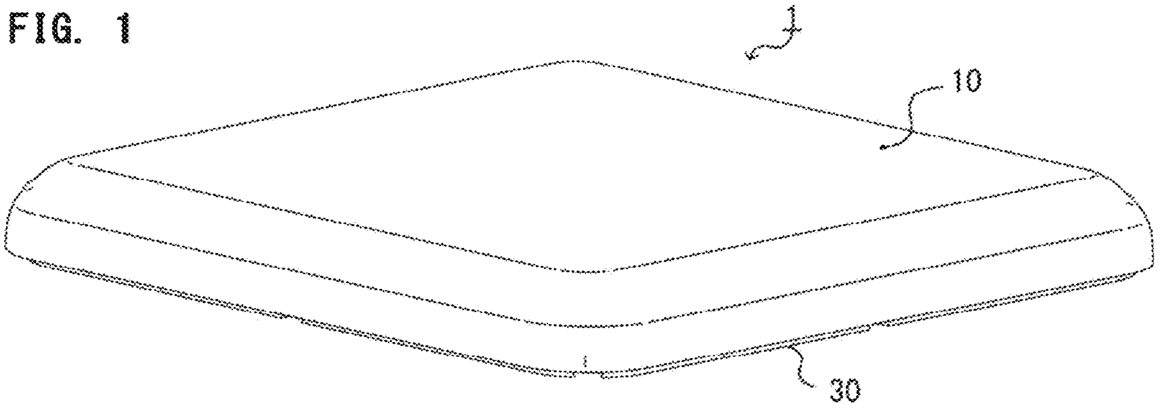
FIG. 1 is an exterior perspective view of an antenna device according to a first embodiment.
Figure 2B:
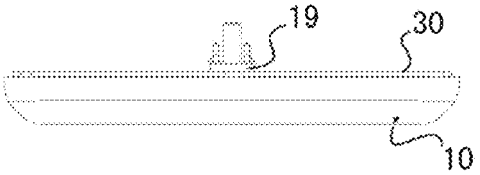
FIG. 2A is a top view of an antenna element and FIG. 2B to FIG. 2E are side views thereof.
Figure 2D:
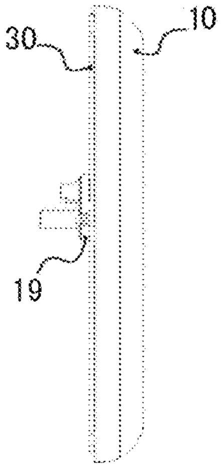
Figure 2A:
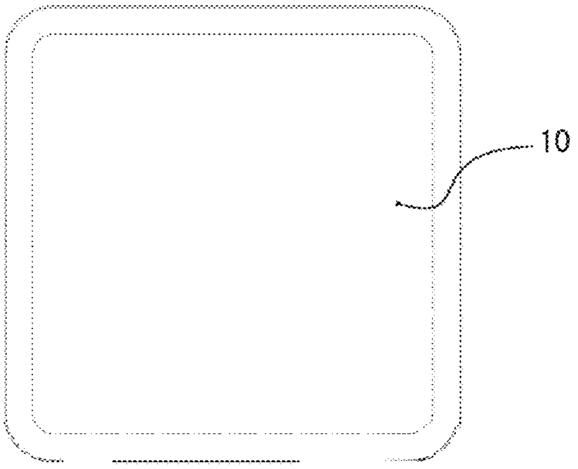
Figure 2E:
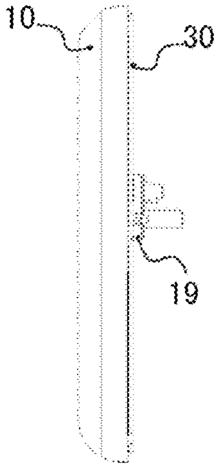
Figure 2C:
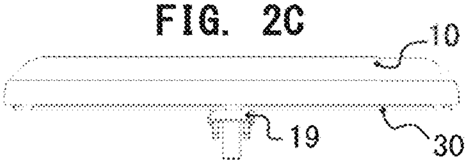
Figure 3:
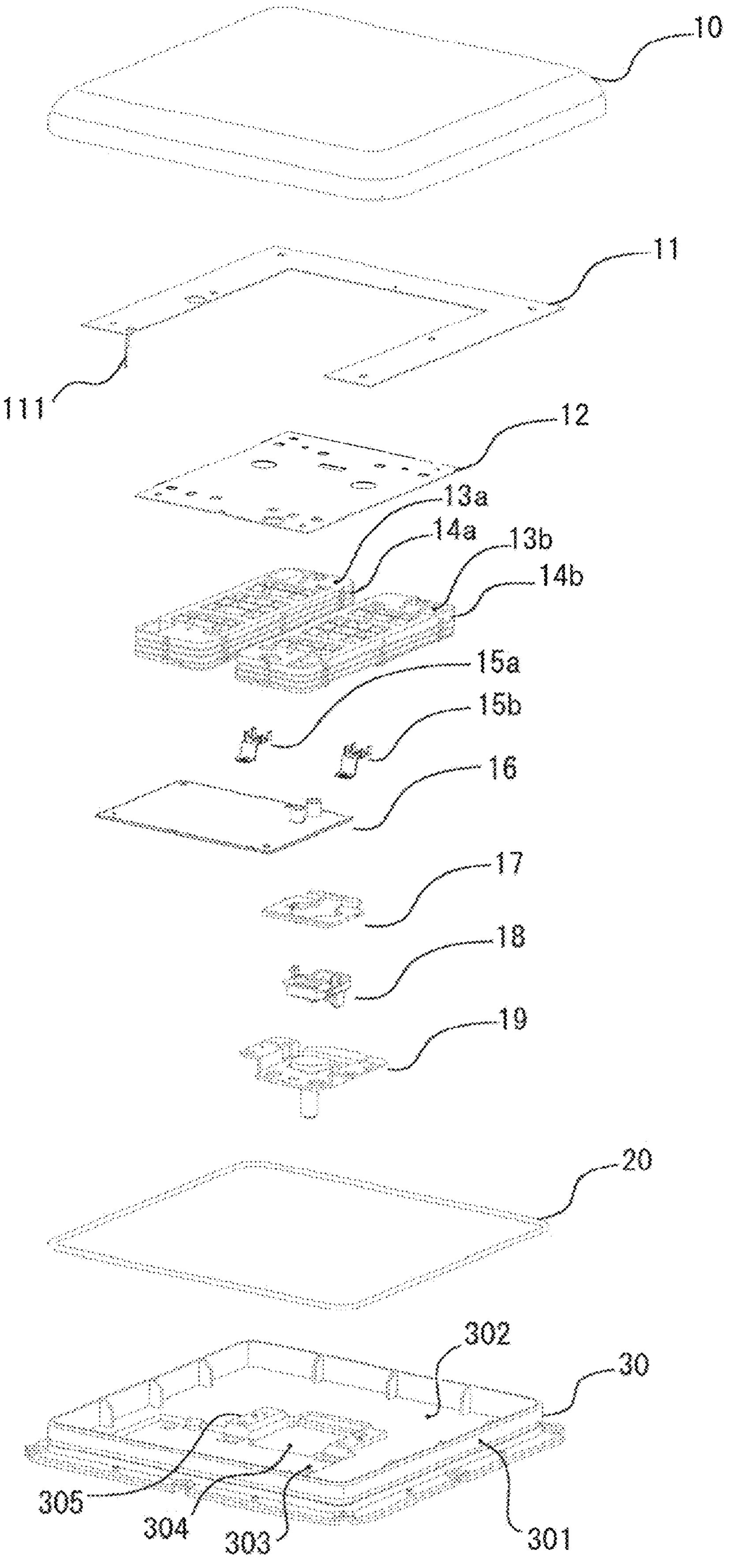
FIG. 3 is an exploded perspective view of the antenna device according to the first embodiment.

FIG. 1 is an exterior perspective view of an antenna device 1 according to the first embodiment. FIG. 2A is a top view of the antenna device 1, FIG. 2B to FIG. 2E are side views thereof, and FIG. 3 is an exploded perspective view of the antenna device 1. Referring to these drawings, the height of the antenna case of the antenna device 1 is 15 mm to 12 mm when measured from the mounting surface of the vehicle, with the attachment surface being set at a ground potential. The antenna case includes a cover portion 10 that is capable of transmitting radio waves and a resin base portion 30. The shape of the cover portion 10 is a cylinder having an opening plane and a bottom surface, and the inner wall (the bottom portion) of the cover portion 10 is formed in a plane or substantially plane surface.

The antenna elements are accommodated in the antenna case. Each of the antenna elements includes a conductive plate of a predetermined area and a reactance element. One of the two conductive plates is used mainly for receiving the FM band and the opposing surface faces the surface at the ground potential, that is, the attachment surface of the vehicle. With this configuration, capacitance which is caused between the conductive plate and the attachment surface is loaded into the conductive plate (capacitance loading). For this reason, this conductive plate is hereinafter referred to as a “capacitance loading plate”. The other of the two conductive plates is used for receiving the AM band and positioned on the outer side of the capacitance loading plate. Thus, the conductive plate on the outer side is hereinafter referred to as an “outer side plate”. A capacitance loading plate 12 is a rectangular conductive plate of the area of 14850 mm$^2$ (=110 mm×135 mm). An outer side plate 11 is a U-shaped (in a quadrate shape without one edge) conductive plate of the area of 5700 mm$^2$ (=(15 mm×150 mm)+(10 mm×120 mm)+(15 mm×150 mm)). The outer side plate 11 and the capacitance loading plate 12 are fixed to the inner wall of the cover portion 10. This means that the outer side plate 11 and the capacitance loading plate 12 of the antenna element are provided in an identical plane or a substantially identical plane. In the example in FIG. 3, a plurality of holes are formed in the outer side plate 11 and the capacitance loading plate 12. However, these holes do not substantially affect electrical characteristics because these are screw holes and guide holes for positioning.

The two reactance elements in the example of this embodiment are both linear conductors wound in a helical shape. In the first embodiment, as the reactance elements, linear conductors that are held by a first holder 13*a* and a second holder 13*b* are used. The holders 13*a* and 13*b* are made of resin and fixed to the inner wall of the cover portion 10 with the capacitance loading plate 12 interposed therebetween. This means that, while in an example the reactance element is downsized by winding a linear conductor around a dielectric body, in the first embodiment, an example in which the reactance element is formed by only a linear conductor is shown. Accordingly, for simplification of description, each of the two reactance elements is referred to as a “coil”.

A first coil 14*a* is held by being wound around the surface of the first holder 13*a*. A second coil 14*b* is held by being wound around the surface of the second holder 13*b*. One end of the first coil 14*a* is coupled to a first end portion of the capacitance loading plate 12 and the other end is coupled to a feeding point. One end of the second coil 14*b* is coupled to a second end portion, which is different from the first end portion, of the capacitance loading plate 12 and the other end is coupled to a ground conductor. Connection forms of these will be described in detail later.

The outer side plate 11 is capable of receiving radio waves at various frequencies. In the first embodiment, the outer side plate 11 is used for receiving AM band signals (AM signals); in other words, the outer side plate 11 per se forms an AM broadcast receiving element. AM signals received by the outer side plate 11 are led to a printed circuit board 16 described below via a feeding portion 111 that is at the end portion of the outer side plate 11. In contrast, the capacitance loading plate 12 is capable of receiving FM band signals (FM signals) by being coupled to the first coil 14*a* and the second coil 14*b*; in other words, the capacitance loading plate 12 and the two coils 14*a* and 14*b* form an FM broadcast receiving element that resonates in the FM band. Received FM band signals are led to the printed circuit board 16 via the feeding point to which the first coil 14*a* is coupled.

The printed circuit board 16 is positioned below the first holder 13*a* and the second holder 13*b*. The printed circuit board 16 contains an electronic circuit. The electronic circuit includes, for example, a first input terminal to which AM signals received by the outer side plate 11 are input and a second input terminal in communication with the feeding point of the first coil 14*a*. The electronic circuit also includes an AM amplifying circuit that amplifies AM signals input from the first input terminal and an FM amplifying circuit that amplifies FM signals input from the second input terminal. The electronic circuit also includes output terminals that output AM signals amplified by the AM amplifying circuit and FM signals amplified by the FM amplifying circuit. A synthesis circuit that synthesizes AM signals and FM signals may be provided at a stage before the output terminal. A filter, a tuning circuit, or the like may be provided at a stage before the AM amplifying circuit.

In the printed circuit board 16, a GND pattern in communication with ground terminals of the amplifying circuits or the like is formed. A pair of GND terminals 15*a* and 15*b*, which are made of metal, are fixed to the GND pattern. The GND terminals 15*a* and 15*b* are members used for conducting with a conductive base 19 made of metal. A cable holder

17 is fixed to the back surface of the printed circuit board 16. The cable holder 17 holds signal cables electrically coupled to a first output terminal and a second output terminal.

The resin base portion 30 is formed by a frame 301 protruding upwardly from a portion slightly inside the outer periphery of the resin base portion 30 and a bottom portion 302 surrounded by the frame 301, the frame 301 and the bottom portion 302 being integrally formed. The frame 301 is formed in a size substantially identical to the size of the opening plane of the cover portion 10. The frame 301 has an outer side surface in which a groove is formed to extend along the entire periphery of the frame 301. An O-ring 20 formed of an elastic member is fitted into the groove. The depth of the groove is shorter than the diameter of the O-ring 20. As a result, when the cover portion 10 is engaged in the resin base portion 30, the O-ring 20 seals the space inside the bottom portion 302 in a watertight manner.

In the bottom portion 302 of the resin base portion 30, a depression 303, which accommodates and fixes the printed circuit board 16, and a hole portion 304, which enables a prelock member 18 and the conductive base 19 to project downwardly, are formed. The prelock member 18 is a member for temporary fixing the antenna device 1 when the antenna device 1 is attached to, for example, a vehicle roof. A fixing base 305 to which the prelock member 18 and the conductive base 19 are screwed is joined to the bottom portion 302. The conductive base 19 is used for firmly fixing the antenna device 1 to, for example, a vehicle roof, and when attached, the conductive base 19 causes the GND pattern of the printed circuit board 16 to be set at the ground potential by using the GND terminals 15*a* and 15*b*.

Figure 4:
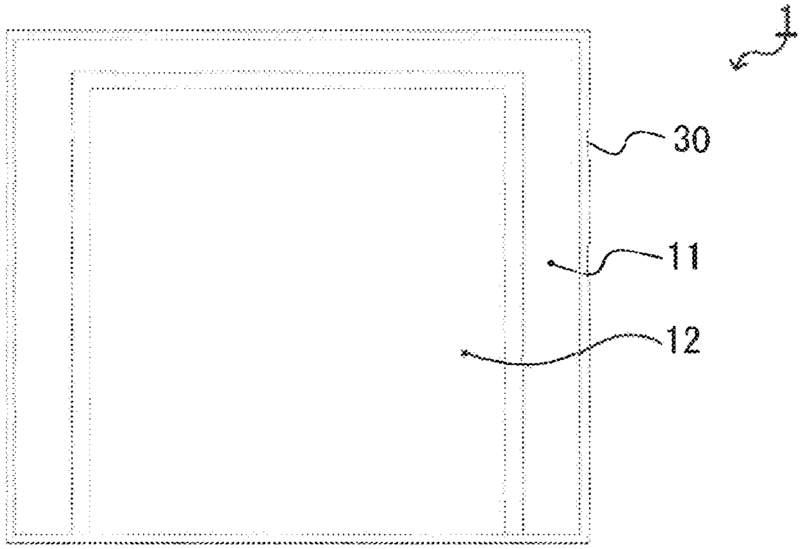
FIG. 4 is a top view illustrating a positional relationship between an outer side plate and a capacitance loading plate according to the first embodiment.

A positional relationship between the outer side plate 11 and the capacitance loading plate 12 is illustrated in FIG. 4. The plurality of holes illustrated in FIG. 3 are omitted in FIG. 4. Referring to FIG. 4, the outer side plate 11 surrounds about ¾ of the outer periphery of the capacitance loading plate 12. Further, the outer side plate 11 and the capacitance loading plate 12 are positioned with a predetermined spacing therebetween not to position one end portion and the other facing end portion in an overlapping manner. As described above, the outer side plate 11 and the capacitance loading plate 12 are positioned in an identical plane or a substantially identical plane and there is thus no projection. This simplifies the exterior of the cover portion 10 and contributes to low-profile design of the antenna device 1. Since the facing end portions of the outer side plate 11 and the capacitance loading plate 12 are spaced apart from each other and not positioned in an overlapping manner, no interference occurs.

Figure 5A:
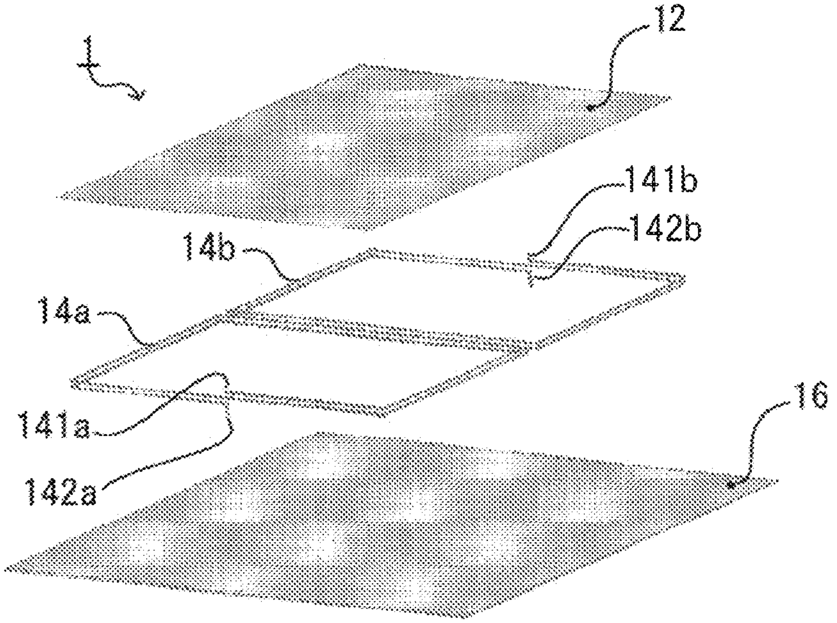
FIG. 5A is a schematic diagram illustrating a positional relationship between the capacitance loading plate and coils and FIG. 5B is a simple diagram thereof.
Figure 5B:
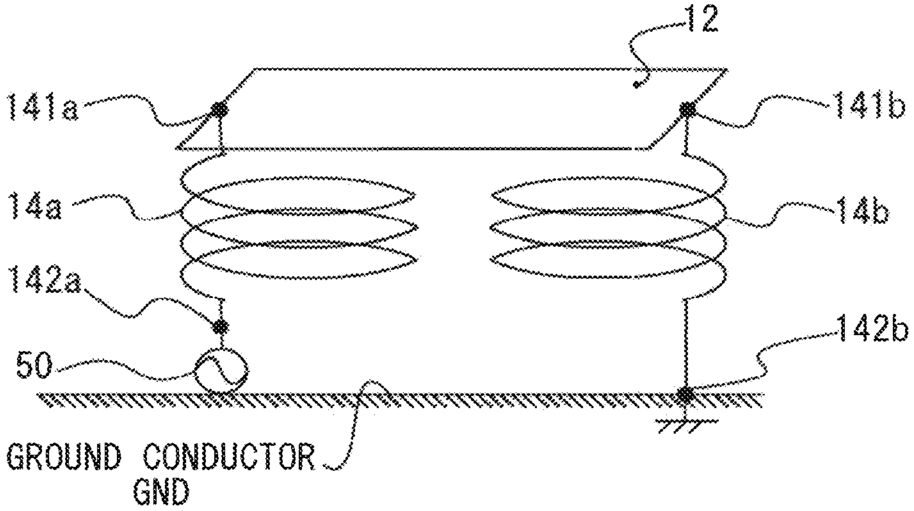

One feature of the antenna device 1 according to the first embodiment is the configuration of the antenna element, in particular, the configuration of the FM broadcast receiving element. These configurations are described in detail below. FIG. 5A is a schematic diagram illustrating a positional relationship between the capacitance loading plate 12 included in the antenna device 1, and the first coil 14*a* and the second coil 14*b*, and FIG. 5B is a simple diagram thereof. The shape of the printed circuit board 16 is similar to the shape of the capacitance loading plate 12 while the size of the printed circuit board 16 is slightly larger than the size of the capacitance loading plate 12, however, the size difference matters little. A ground conductor GND illustrated in FIG. 5B is a portion of a vehicle roof in communication with the GND terminals 15*a* and 15*b*, and the conductive base 19 that are illustrated in FIG. 3. The first holder 13*a*, the second holder 13*b*, and other members are omitted for the sake of convenience.

The size of the capacitance loading plate 12 is as described above and the height of the capacitance loading plate 12 from the ground conductor GND is approximately 10 mm. The major and minor diameters (the long diameter and the short diameter) of the first coil 14*a* and the major and minor diameters (the long diameter and the short diameter) of the second coil 14*b* are about ½ of the dimensions (105 mm×70 mm) of the capacitance loading plate 12. The first coil 14*a* and the second coil 14*b* are both wound at a predetermined winding pitch and have the same inductance value. The first coil 14*a* and the second coil 14*b* are spaced about 5 mm apart from each other and provided not to be positioned in an overlapping manner.

The major and minor diameters (the long diameter and the short diameter), the shape, and the size of each of the first coil 14*a* and the second coil 14*b* are not limited to the examples described above and may be optionally modified depending on, for example, the installation space. The same holds for the spaced distance between the first coil 14*a* and the second coil 14*b*.

One end 141*a* of the first coil 14*a* is coupled to the first end portion of the capacitance loading plate 12 while another end 142*a* is coupled to a feeding point 50 via a wire pattern of the printed circuit board 16. One end 141*b* of the second coil 14*b* is coupled to the second end portion (an end portion opposite to the first end portion), which is different from the first end portion described above, of the capacitance loading plate 12, while another end 142*b* is coupled to the ground conductor GND via the GND pattern of the printed circuit board 16. With this configuration, the first coil 14*a* and the second coil 14*b* operate, in conjunction with the capacitance loading plate 12, as a series resonance circuit in the FM band. This means that the electrical length from the other end 142*a* of the first coil 14*a* via the capacitance loading plate 12 to the other end 142*b* of the second coil 14*b* is equal to a resonant length in the FM band (an electrical length of ½ of a wave length λ of a frequency used in the FM band, the same holds for the following description). FM signals can be obtained from the feeding point 50.

Figure 6A:
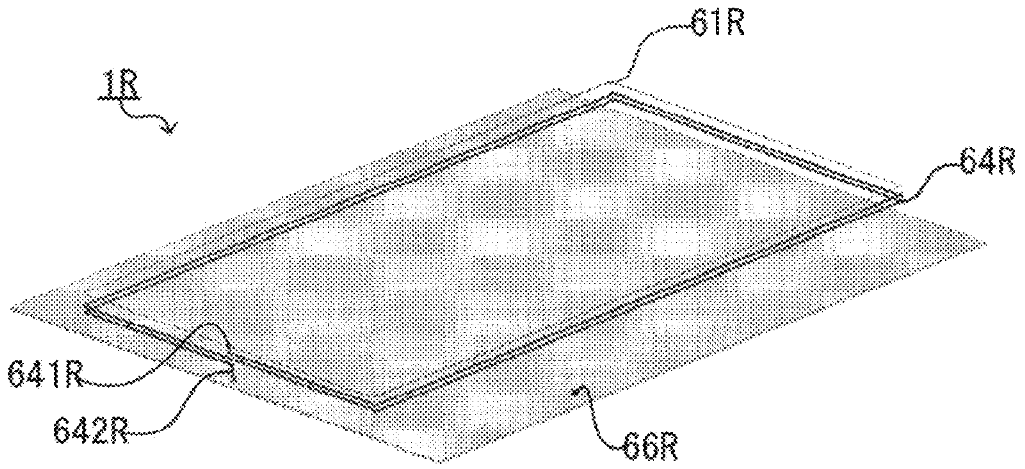
FIG. 6A is a schematic diagram illustrating a positional relationship between a reference plate and a reference coil included in a reference antenna and FIG. 6B is a simple diagram thereof.
Figure 6B:
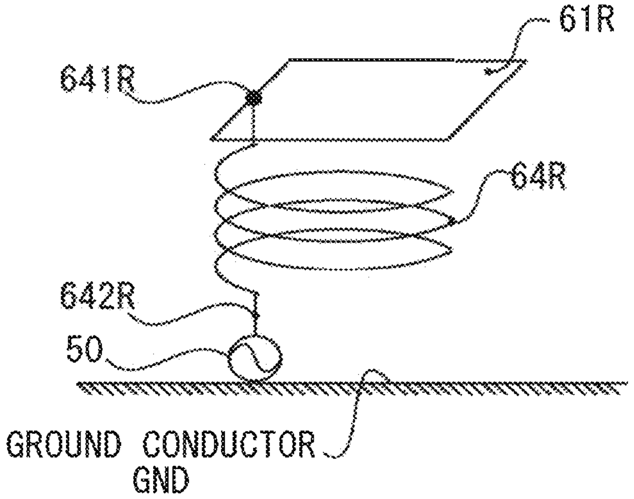

The present inventors made a reference antenna for the purpose of comparing electrical characteristics. The reference antenna includes: 1) a reference plate of which the material and the area are identical to those of the capacitance loading plate 12 included in the antenna device 1; and 2) a reference coil of which the wire material and the wire diameter are identical to those of the first coil 14*a* and the second coil 14*b*, and the diameter defines the area identical to the area defined by the total of the diameters of the first coil 14*a* and the second coil 14*b*. FIG. 6(*a*) is a schematic diagram illustrating a positional relationship between a reference plate (a conductive plate corresponding to the capacitance loading plate 12) 61R and a reference coil (a reactance element) 64R that are included in a reference antenna 1R, and FIG. 6B is a simple diagram thereof. The reference plate 61R is illustrated transparently in FIG. 6A for the sake of convenience. One end 641R of the reference coil 64R is coupled to an end portion of the reference plate 61R while another end 642R is coupled to the feeding point 50. The material and the size ratio of the printed circuit board 66R, the connection state of the reference coil 64R and the feeding point 50, the distance between the ground conductor GND and the base end of the reference coil 64R, the distance between the ground conductor GND and the distal end of the reference coil 64R, and the distance between the distal end of the reference coil 64R and the lower surface of the reference plate 61R are identical to those of the antenna device 1.

Concerning the reference antenna 1R, when the current that flows through the reference coil 64R is $I_1$, the antenna impedance is $Z_1$, and the radiated power (used synonymously with receiving power; the same holds for the following description) is $P_1$, $P_1$ is expressed as $Z_1 \times I_1^2$. The value of the antenna impedance is, for example, an impedance value on a real axis when a Smith chart is used. As the antenna impedance approaches the feeding impedance (50Ω in this embodiment), the radiation efficiency (used synonymously with reception efficiency; the same holds for the following description) increases, and as a result, the electric power increases. According to a simulation experiment of the present inventors, the antenna impedance of the reference antenna 1R was 0.06Ω.

Contrary to this, concerning the FM antenna included in the antenna device 1 of the first embodiment, when a radiated power $P_2$ is identical to the radiated power $P_1$ of the reference antenna 1R and the current that flows through the first coil 14*a* and the second coil 14*b* is $I_2$, the current $I_2$ is ½ of the current $I_1$. Thus, an antenna impedance $Z_2$ is four times as much as $Z_1$. This means that, with respect to the reference antenna 1R having one coil, the antenna impedance increases in proportion to the square of the number of coils. The present inventors confirmed that the antenna impedance of the FM antenna of the first embodiment increased to 0.23Ω, which is four times as much as the antenna impedance of the reference antenna 1R.

Figure 7:
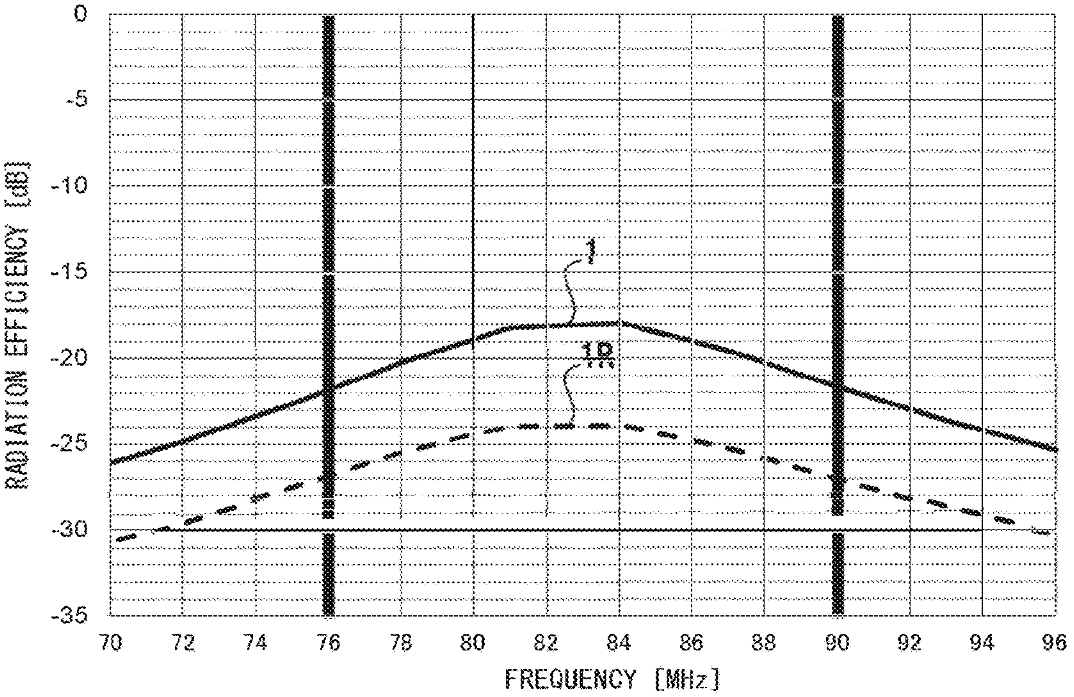
FIG. 7 is a diagram of radiation efficiency characteristic in the FM band according to the first embodiment.

FIG. 7 is a diagram of radiation efficiency characteristic in the FM band. In the drawing, a solid line indicates the radiation efficiency in the FM band of the antenna device 1 according to the first embodiment and a dashed line indicates the radiation efficiency of the reference antenna 1R. In the FM band in Japan that is indicated between thick lines, the average radiation efficiency of the reference antenna 1R was −25.2 dB while the average radiation efficiency of the FM antenna according to the first embodiment was −19.6 dB. As described above, by increasing the number of coils coupled to the capacitance loading plate 12, the antenna impedance is increased, and as a result, the reception gain and the radiation efficiency in the FM band are greatly improved. Although it is omitted in the diagram, the average radiation efficiency in the AM band was −70.0 dB.

Figure 8A:
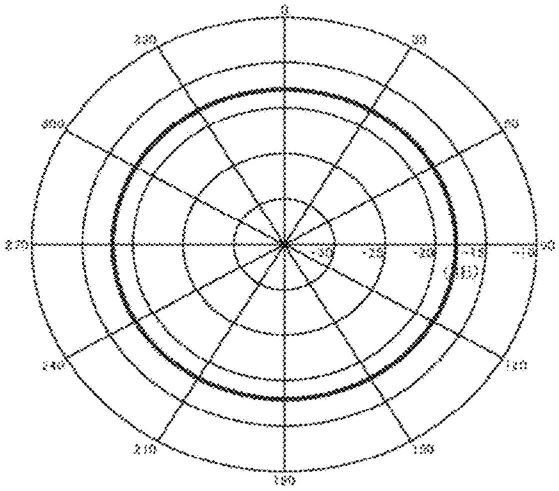
FIG. 8A is an FM band directional diagram and FIG. 8B is an AM band directional diagram.
Figure 8B:
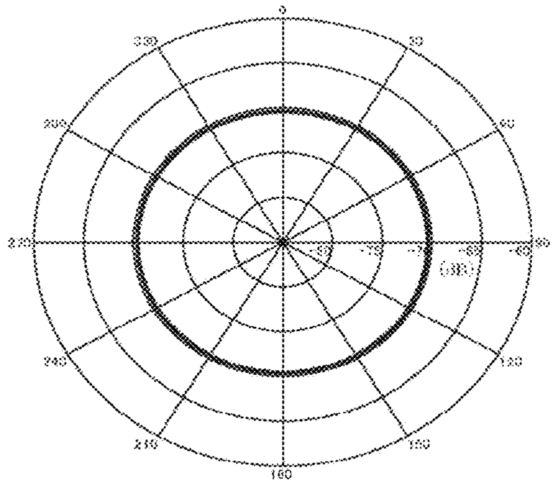

FIG. 8A is a directional characteristic diagram of the antenna device 1 according to the first embodiment in a horizontal plane with vertical polarization in the FM band and FIG. 8B is a directional characteristic diagram in a horizontal plane with vertical polarization in the AM band. As seen from these characteristic diagrams, the antenna device 1 of the first embodiment is omnidirectional in the horizontal plane with vertical polarization in the FM band and also in the horizontal plane with vertical polarization in the AM band.

Second Embodiment

Next, a second embodiment of the present invention is described. In the second embodiment, with regard to the outer side plate 11 and the capacitance loading plate 12 included in the antenna device 1 of the first embodiment, the materials and the thicknesses are not changed while the shapes and the layouts are changed. The structures of other members including the first coil 14*a* and the second coil 14*b* are similar to those of the first embodiment and thus denoted by the same names and the same reference characters, and redundant descriptions thereof are omitted.

Figure 9A:
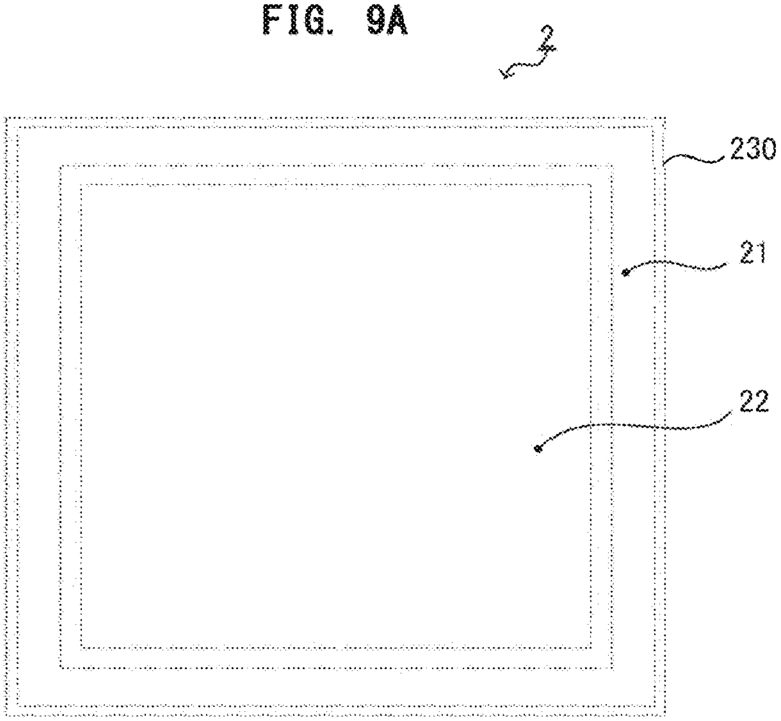
FIG. 9A is a top view of an antenna element according to a second embodiment and FIG. 9B is a schematic diagram illustrating a structure example.
Figure 9B:
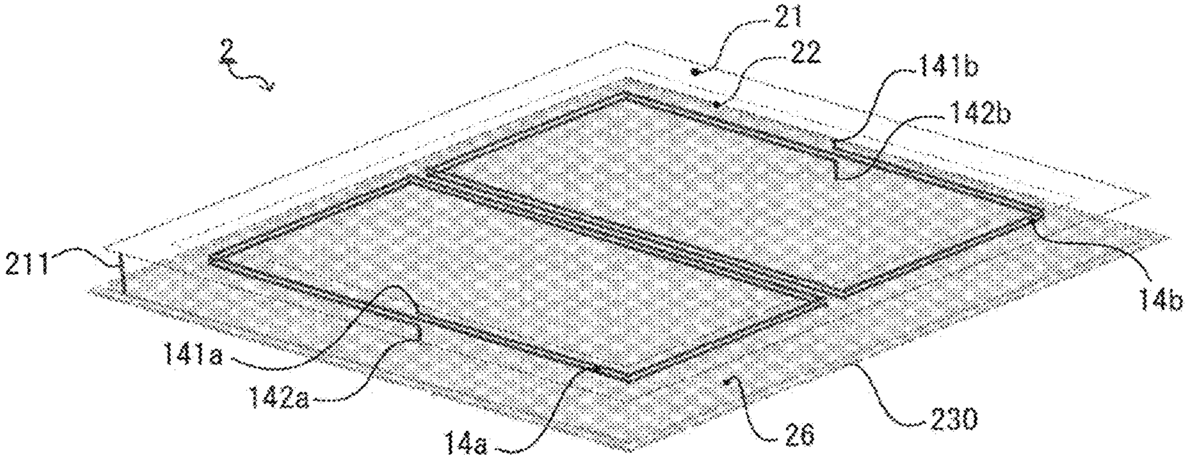

FIG. 9A is a top view of an antenna element included in an antenna device 2 according to the second embodiment and FIG. 9B is a schematic diagram illustrating a structure of the antenna element. In FIG. 9B, the capacitance loading plate is illustrated transparently. The antenna device 2 of the second embodiment includes a rectangular capacitance loading plate 22 and a rectangular-annular outer side plate 21 that surrounds the entire periphery of the capacitance loading plate 22 in an identical plane or a substantially identical plane. The outer side plate 21 and the capacitance loading plate 22 are spaced about 5 mm apart from each other so that the facing end portions are not positioned in an overlapping manner. The area of the capacitance loading plate 22 is 14400 mm$^2$ (=120 mm×120 mm). The area of the outer side plate 21 is 5600 mm$^2$ (=(10 mm×150 mm)+(10 mm×130 mm)+(10 mm×150 mm)+(10 mm×130 mm)). The distance between the ground conductor GND and the outer side plate 21 and the distance between the ground conductor GND and the capacitance loading plate 22 are identical to those of the antenna device 1 of the first embodiment. A resin base portion 230 is slightly larger in size than the outer side plate 21.

AM signals received by the outer side plate 21 are led to an electronic circuit of a printed circuit board 26 on a resin base portion 230 via a feeding portion 211 at an end portion of the outer side plate 21. That is, similarly to the first embodiment, the outer side plate 21 operates as an AM broadcast receiving element.

One end 141*a* of the first coil 14*a* is coupled to a first end portion of the capacitance loading plate 22 while another end 142*a* is coupled to a feeding point 50 via a wire pattern of the printed circuit board 26. One end 141*b* of the second coil 14*b* is coupled to a second end portion (an end portion opposite to the first end portion), which is different from the first end portion described above, of the capacitance loading plate 22, while another end 142*b* is coupled to the ground conductor GND via a GND pattern of the printed circuit board 26. With this configuration, similarly to the first embodiment, the first coil 14*a* and the second coil 14*b* operate, in conjunction with the capacitance loading plate 22, as a series resonance circuit in the FM band. FM signals can be obtained from the feeding point 50.

According to the observation of the present inventors, the average radiation efficiency and the directivity in a horizontal plane with vertical polarization in the FM band in Japan were similar to those of the antenna device 1 of the first embodiment. The antenna impedance was also nearly unchanged from that of the first embodiment. This means that the radiation efficiency or the like in the FM band are similar to those of the antenna device 1 of the first embodiment. Also in the AM band, the directivity in a horizontal plane with vertical polarization was not changed from that of the antenna device 1 of the first embodiment and the radiation efficiency was substantially equal to that of the antenna device 1 of the first embodiment.

As described above, although the antenna device 2 of the second embodiment employs the configuration in which the entire periphery of the rectangular capacitance loading plate 22 is surrounded by the rectangular-annular outer side plate 21 in an identical plane or a substantially identical plane, the radiation efficiency in the AM band substantially equal to the radiation efficiency of the antenna device 1 of the first embodiment can be achieved. Furthermore, as long as the shape and the size (the area) of the outer side plate 11 are determined, the capacitance loading plate 22 can be accordingly formed simply by, for example, punching, and this results in the simplification of manufacturing processing.

The outer side plate 21 may be formed such that the height of part or all of the outer edge decreases toward the outer periphery without changing the area. In this case, since the height of a portion of the outer side plate 21 is relatively low, the radiation efficiency in the AM band becomes slightly low, however, this does not substantially affect in actual use. This configuration has an advantage that, for example, the cover portion 10 included in the antenna device 1 of the first embodiment can be downsized.

Third Embodiment

Next, a third embodiment of the present invention is described. Concerning an antenna device 3 of the third embodiment, in an FM broadcast receiving element including a conductive plate of a predetermined area and two reactance elements, a first coil 34*a* and a second coil 34*b* adjacent to each other are wound in directions opposite to each other. The structures of the outer side plate 11, the capacitance loading plate 12, and other members are similar to those of the first embodiment and thus denoted by the same names and the same reference characters, and redundant descriptions thereof are omitted.

Figure 10A:
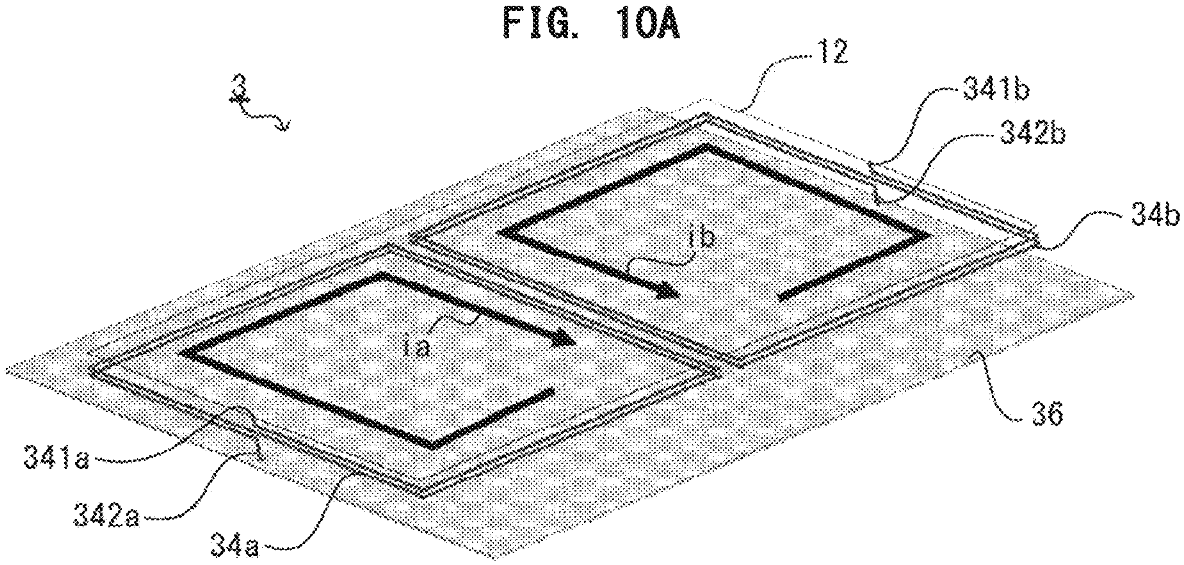
FIG. 10A is a schematic diagram of a structure of an FM antenna according to a third embodiment and FIG. 10B is a diagram schematically illustrating a structure of an FM antenna according to a comparative example.
Figure 10B:
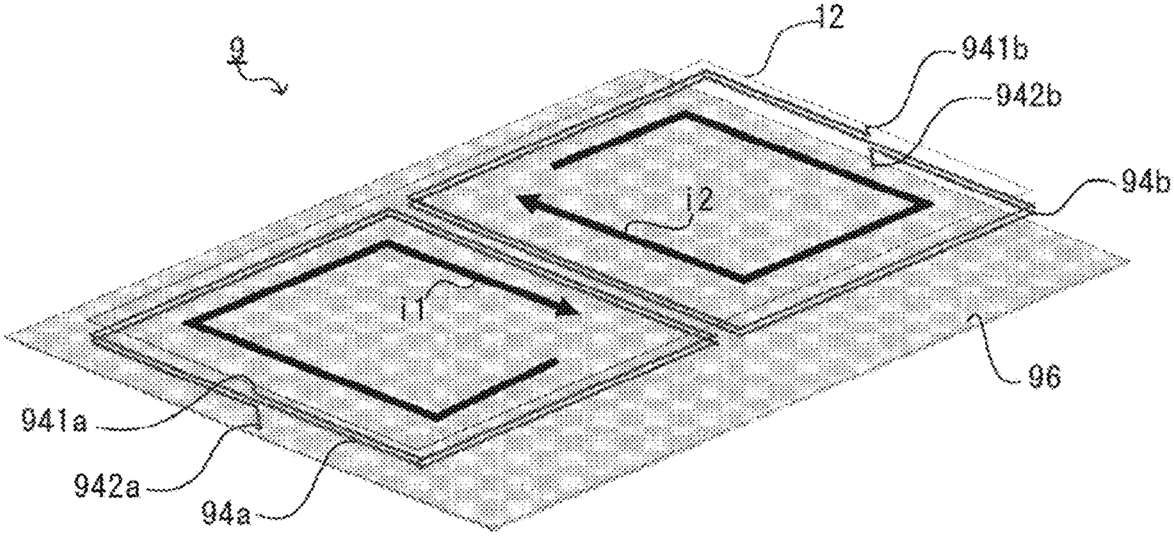

FIG. 10A is a diagram schematically illustrating a structure of an FM antenna of the antenna device 3 of the third embodiment and FIG. 10B is a diagram schematically illustrating a structure of an FM antenna of an antenna device 9 of a comparative example. For the sake of convenience, the capacitance loading plate 12 is illustrated transparently.

In the antenna device 3 of the third embodiment, the second coil 34*b* is wound in a direction opposite to a direction in which a second coil 94*b* included in the antenna device 9 of the comparative example is wound. The material, the length (the winding pitch), and the diameter of the linear conductor are identical to those of the first coil 34*a*. One end 341*a* of the first coil 34*a* is coupled to the first end portion of the capacitance loading plate 12, while another end 342*a* is coupled to a feeding point, which is not illustrated in the drawing, via a wire pattern of a printed circuit board 36. One end 341*b* of the second coil 34*b* is coupled to the second end portion (an end portion opposite to the first end portion) of the capacitance loading plate 12 different from the first end portion described above, while another end 342*b* is coupled to the ground conductor GND via a GND pattern of the printed circuit board 36. In this configuration, a current ia flowing through the first coil 34*a* and a current ib flowing through the second coil 34*b* flow in the same direction at a portion where the first coil 34*a* and the second coil 34*b* are adjacent to each other. Contrary to this, in the antenna device 9 of the comparative example, a current i1 flowing through a first coil 94*a* and a current i2 flowing through the second coil 94*b* flow in directions opposite to each other at a portion where the first coil 94*a* and the second coil 94*b* are adjacent to each other, and thus, the current i1 and the current i2 cancel each other out.

Figure 11:
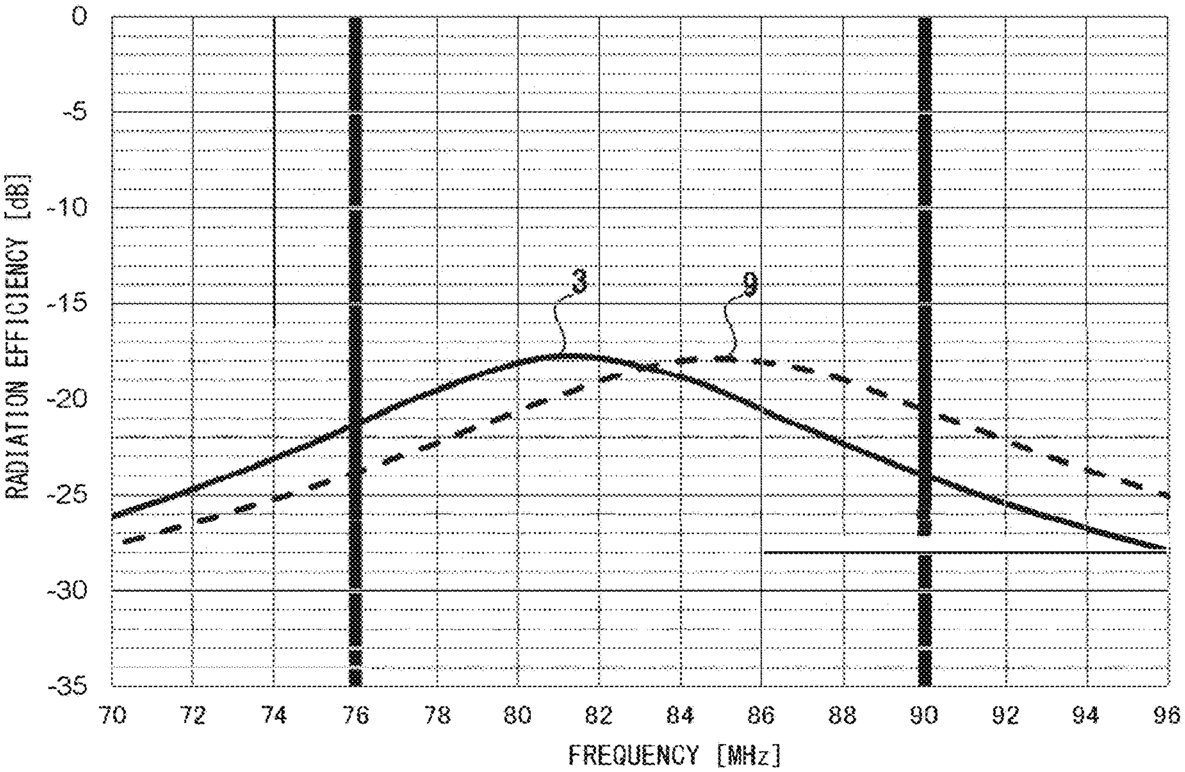
FIG. 11 is a diagram of radiation efficiency characteristic in the FM band according to the third embodiment.

FIG. 11 is a diagram of radiation efficiency characteristic in the FM band. A solid line represents the antenna device 3 of the third embodiment and a dashed line represents the antenna device 9 of the comparative example. As seen from the characteristic diagram, in the case of the antenna device 9 of the comparative example, since the first coil 94*a* and the second coil 94*b* are both wound in the same direction, the current i1 and the current i2 cancel each other out. The inductance value thus decreases, and as a result, the frequency characteristic is moved to a higher range side in comparison to the antenna device 3 of the third embodiment. Contrary to this, in the case of the antenna device 3 of the third embodiment, since the currents flowing through the coils adjacent to each other do not cancel each other out, the decrease in inductance value is suppressed. This means that, the coil length for resonance at a desired frequency is reduced, and as a result, in comparison to the antenna device 9 of the comparative example, the conductor loss decreases and the radiation efficiency increases.

Fourth Embodiment

Next, a fourth embodiment of the present invention is described. The first embodiment is described on the basis that the winding pitches (the coil lengths) of the two coils are identical (5:5) to each other. When the electrical length from the other end 142*a* of the first coil 14*a* via the capacitance loading plate 12 to the other end 142*b* of the second coil 14*b* is a resonant length (½ of a wave length λ of a frequency in use) of the FM band, the winding pitches of the two coils 14*a* and 14*b* are not necessarily identical to each other. In the fourth embodiment, the case in which the winding pitch of a coil is different from the winding pitch of another coil in the antenna device 1 of the first embodiment is described. The structures of the outer side plate 11, the capacitance loading plate 12, and other members are similar to those of the first embodiment and thus denoted by the same names and the same reference characters, and redundant descriptions thereof are omitted.

Figure 12A:
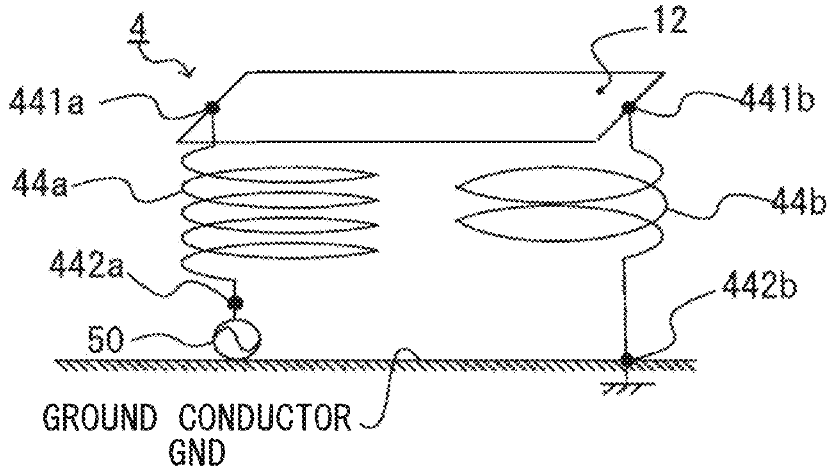
FIG. 12A and FIG. 12B are simple diagrams of FM broadcast receiving elements according to a fourth embodiment.
Figure 12B:
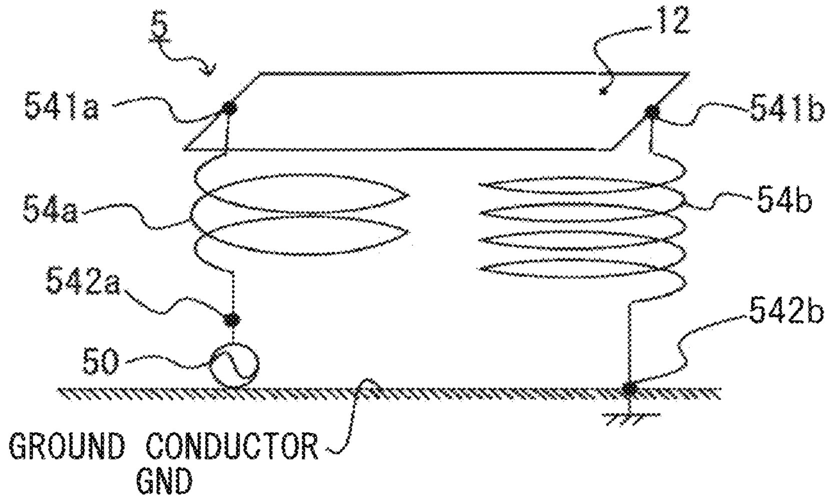

FIG. 12B includes simple diagrams of FM broadcast receiving elements of an antenna device 4 of the fourth embodiment. FIG. 12A illustrates the antenna device 4 in which the winding pitches of a first coil 44*a* and a second coil 44*b* are 6:4 and FIG. 12B illustrates an antenna device 5 in which the winding pitches of a first coil 54*a* and a second coil 54*b* are 4:6.

Figure 13:
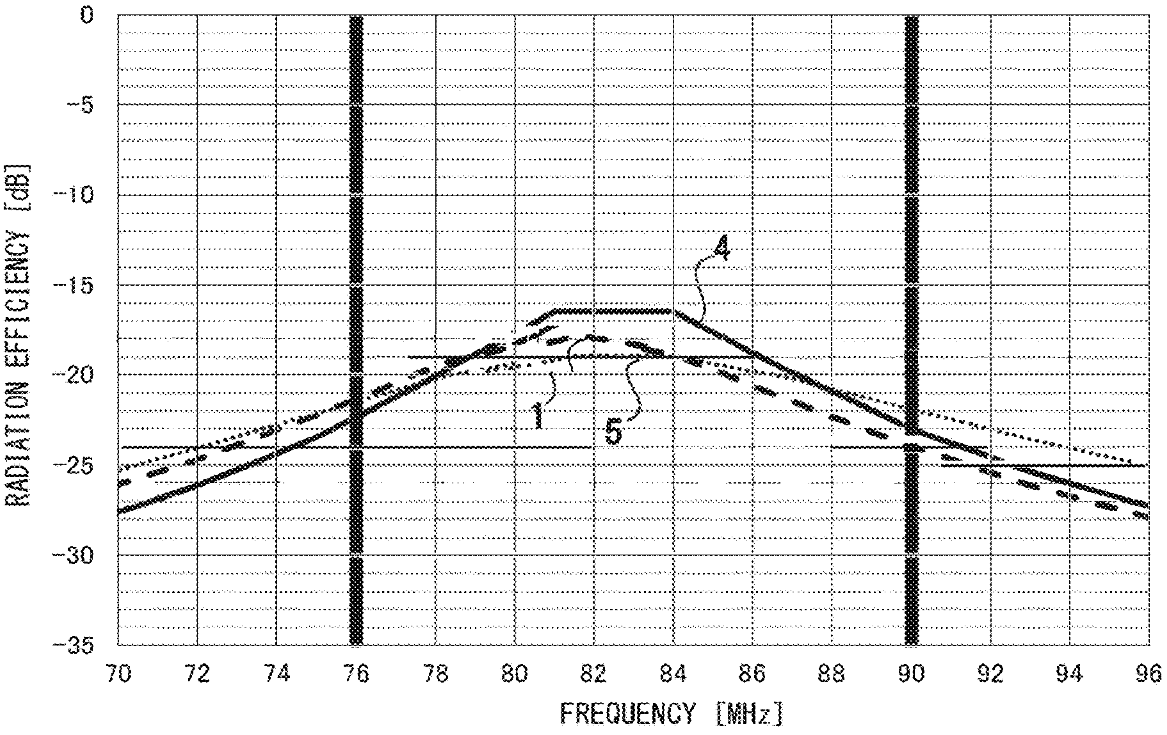
FIG. 13 is a diagram of radiation efficiency characteristic in the FM band according to the fourth embodiment.

FIG. 13 is a diagram of radiation efficiency characteristic in the FM band. A solid line represents a characteristic of the antenna device 4, a long-dashed line represents a characteristic of the antenna device 1 of the first embodiment in which the winding pitches are 5:5, and a short-dashed line represents a characteristic of the antenna device 5. The average radiation efficiencies in the FM band in Japan, which is indicated between thick lines, were −19.1 dB for the antenna device 4, −19.6 dB for the antenna device 1, and −20.2 dB for the antenna device 5. This indicates that a coil close to the feeding point 50 (the first coil in this embodiment) is configured to have a higher level of inductance (to be specific, for example, by increasing the number of turns). This increases the average radiation efficiency in the FM band.

Fifth Embodiment

Next, a fifth embodiment of the present invention is described. While the second embodiment describes the example of the antenna device 2 including the rectangular capacitance loading plate 22 and the rectangular-annular outer side plate 21 surrounding the entire periphery of the capacitance loading plate 22 in an identical plane or a substantially identical plane, these conductive plates can be of any shape when the area of the outer side plate 21 and the area of the capacitance loading plate 22 are identical to each other. In the fifth embodiment, the case in which the capacitance loading plate is formed in a circular plate-like shape and the outer side plate positioned along the entire circumference of the capacitance loading plate is formed in an annular shape is described. The structures of other members are similar to those of the first embodiment and thus denoted by the same names and the same reference characters, and redundant descriptions thereof are omitted.

Figure 14A:
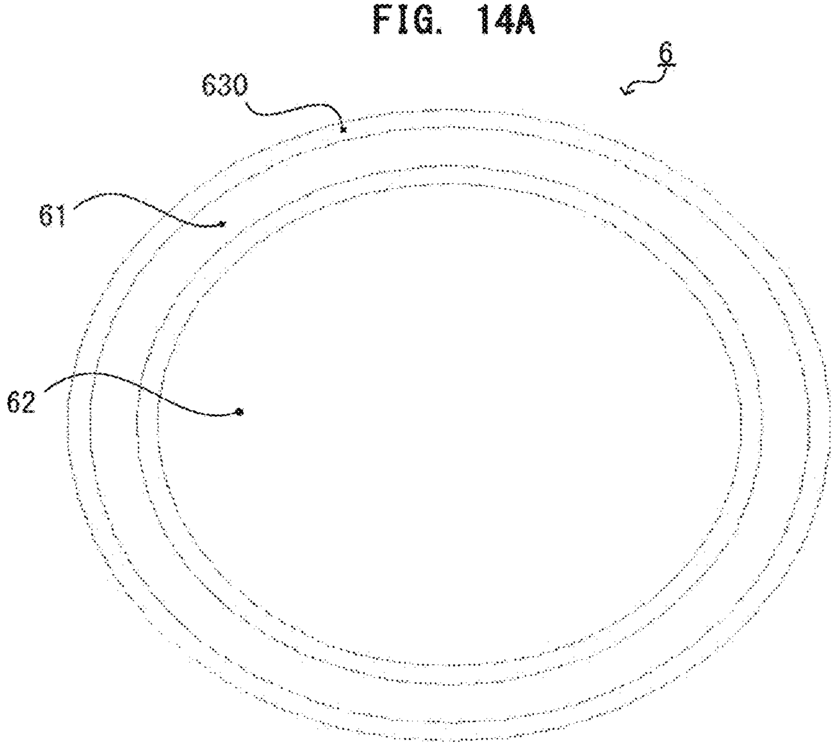
FIG. 14A is a top view of an antenna element according to a fifth embodiment and FIG. 14B is a schematic diagram of the antenna element.
Figure 14B:
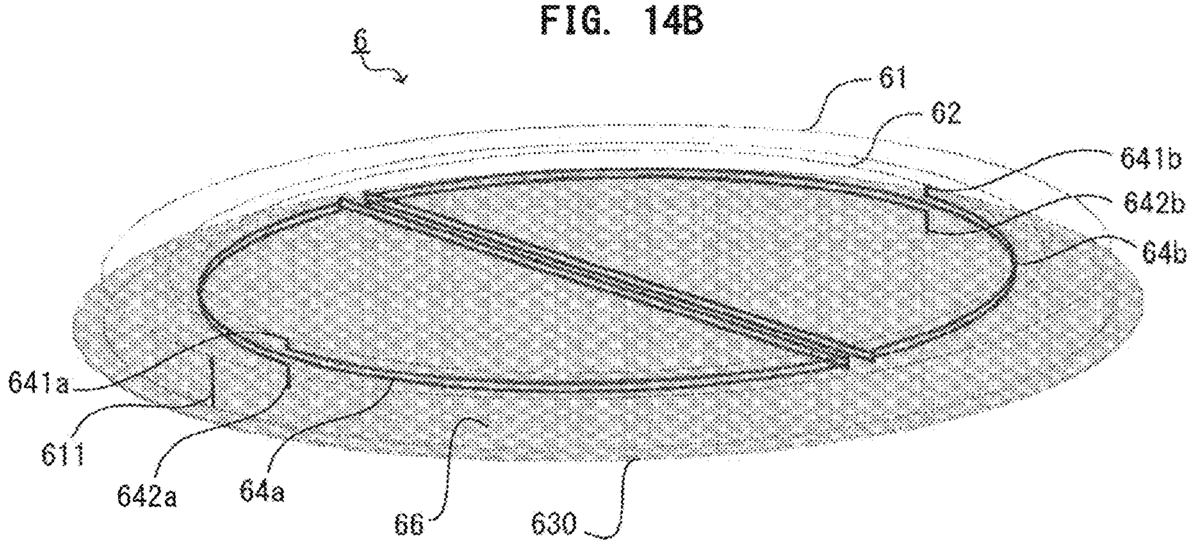

FIG. 14A is a top view of an antenna element of an antenna device 6 according to the fifth embodiment and FIG. 14B is a diagram schematically illustrating a structure of the antenna element.

The antenna device 6 includes a capacitance loading plate 62 in a circular plate-like shape and an outer side plate 61 in an annular shape positioned along the outer circumference of the capacitance loading plate 62. The capacitance loading plate 62 and the outer side plate 61 surrounding the capacitance loading plate 62 are spaced about 5 mm apart from each other not to be positioned in an overlapping manner. The area of the capacitance loading plate 62 is 14527 $mm^2$ (=a diameter of 68 mm). The area of the outer side plate 61 is 5426 $mm^2$ (=a diameter of 84 mm and a width of 11 mm). In FIG. 14B, the capacitance loading plate 62 and the outer side plate 61 are illustrated transparently. The outer circumference of a first coil 64*a* and the outer circumference of a second coil 64*b* are each formed in a semicircle and the total area defined by the outer circumferences is similar to that of the capacitance loading plate 62.

A printed circuit board 66 corresponding to the printed circuit board 16 described in the first embodiment is formed in a shape and a size that are similar to those of the outer side plate 61, however, any shape and any size can be used. A resin base portion 630 below the printed circuit board 66 is formed in a size larger than the size of the antenna element and the size of the printed circuit board 66 so as to accommodate the antenna element and the printed circuit board 66. A member corresponding to the cover portion 10 of the first embodiment is formed in a cylinder having a bottom surface, which is omitted in the drawing.

AM signals received by the outer side plate 61 are led to an electronic circuit of the printed circuit board 66 via a feeding portion 611 at an end portion of the outer side plate 61. One end 641*a* of the first coil 64*a* is coupled to a first end portion of the capacitance loading plate 62, while another end 642*a* is coupled to a feeding point, which is not illustrated in the drawing, via a wire pattern of the printed circuit board 66. One end 641*b* of the second coil 64*b* is coupled to a second end portion (an end portion opposite to the first end portion), which is different from the first end portion described above, of the capacitance loading plate 62 while another end 642*b* is coupled to the ground conductor GND via a GND pattern of the printed circuit board 66. With this configuration, similarly to the first embodiment, the first coil 64*a* and the second coil 64*b* operate, in conjunction with the capacitance loading plate 62, as a series resonance circuit in the FM band. FM signals are output from the feeding point. The distance between the ground conductor GND and the outer side plate 61 and the distance between the ground conductor GND and the capacitance loading plate 62 are identical to those of the antenna device 1 of the first embodiment.

The average radiation efficiency in the FM band of the antenna device 6 of such a configuration was −19.5 dB and this achieves the radiation efficiency similar to that of the antenna device 1 of the first embodiment. The average radiation efficiency in the AM band was −70.0 dB and this achieves the radiation efficiency similar to that of the antenna device 1 of the first embodiment. Concerning the directivity, both in the AM and FM bands, the antenna device 6 is omnidirectional in a horizontal plane with vertical polarization.

In the antenna device 6 of the fifth embodiment, the first coil 64*a* and the second coil 64*b* may be wound in directions opposite to each other and the ratio of winding pitches may be changed. Moreover, the capacitance loading plate 62 may be formed in a substantially circular plate-like shape or a substantially oval shape. In this case, the outer side plate 61, the first coil 64*a*, and the second coil 64*b* are also formed in shapes that match the shape of the capacitance loading plate 62.

Sixth Embodiment

A sixth embodiment of the present invention is described. The sixth embodiment is a modified exemplary embodiment of the first embodiment and the structures of members are similar to those of the first embodiment and thus denoted by the same names and the same reference characters, and redundant descriptions thereof are omitted.

Figure 15A:
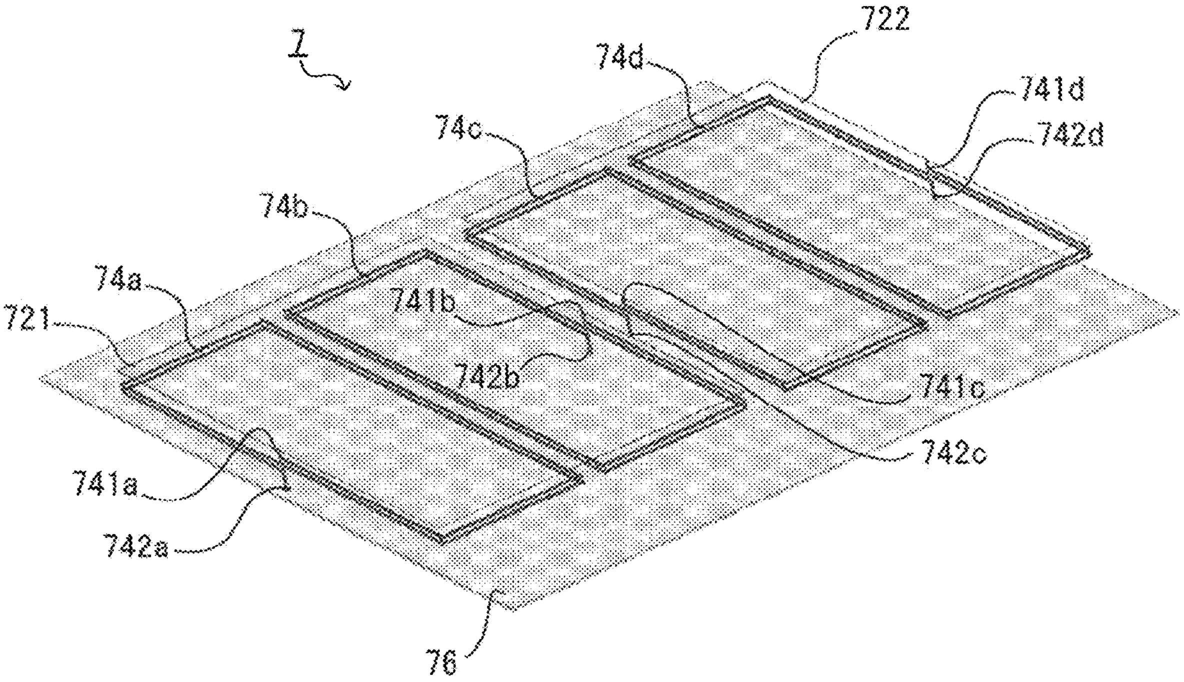
FIG. 15A is a schematic diagram of an FM broadcast receiving element according to a sixth embodiment and FIG. 15B is a simple diagram thereof.
Figure 15B:
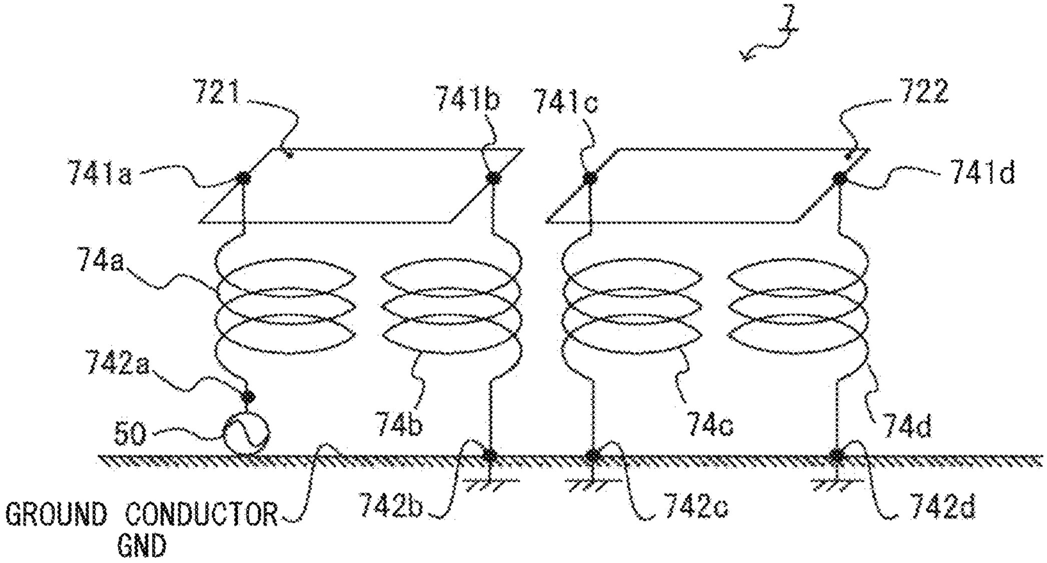

FIG. 15A is a diagram schematically illustrating a structure of an FM broadcast receiving element of an antenna device 7 of the sixth embodiment and FIG. 15B is a simple diagram. The FM broadcast receiving element of the antenna device 7 of the sixth embodiment includes a first FM broadcast receiving element and a second FM broadcast receiving element, each of which resonates in the FM band.

The first FM broadcast receiving element includes a first capacitance loading plate 721 positioned in such a manner that capacitance is caused between the first capacitance loading plate 721 and the ground conductor GND and the capacitance is loaded into the first FM broadcast receiving element. The first FM broadcast receiving element also includes a first coil 74*a* and a second coil 74*b* each coupled to the first capacitance loading plate 721 at one end thereof.

The second FM broadcast receiving element includes a second capacitance loading plate 722 positioned in such a manner that capacitance is caused between the second capacitance loading plate 722 and the ground conductor GND and the capacitance is loaded into the second FM broadcast receiving element. The second FM broadcast receiving element also includes a third coil 74*c* and a fourth coil 74*d* each coupled to the second capacitance loading plate 722 at one end thereof. In the example in FIG. 15A, for ease of description, the first capacitance loading plate 721 and the second capacitance loading plate 722 are illustrated transparently. The area of the first capacitance loading plate 721 and the area of the second capacitance loading plate 722 are each 7350 $mm^2$ (=105 mm×70 mm) and the two areas together are similar to the area of the capacitance loading plate 12 included in the antenna device 1 of the first embodiment. The height from the ground conductor GND is approximately 10 mm.

In the first FM broadcast receiving element, one end 741*a* of the first coil 74*a* is coupled to a first end portion of the first capacitance loading plate 721 while another end 742*a* is coupled to the feeding point 50 via a wire pattern of a printed circuit board 76. Regarding the second coil 74*b*, one end 741*b* is coupled to a second end portion (an end portion opposite to the first end portion of the first capacitance loading plate 721) of the first capacitance loading plate 721 different from the first end portion described above, while another end 742*b* is coupled to the ground conductor GND via a GND pattern of the printed circuit board 76.

In the second FM broadcast receiving element, concerning the third coil 74*c*, one end 741*c* is coupled to a first end portion of the second capacitance loading plate 722 while another end 742*c* is coupled to the ground conductor GND via the GND pattern of the printed circuit board 76. Regarding the fourth coil 74*d*, one end 741*d* is coupled to a second end portion (an end portion opposite to the first end portion of the second capacitance loading plate 722) of the second capacitance loading plate 722 different from the first end portion described above, while another end 742*d* is coupled to the ground conductor GND via the GND pattern of the printed circuit board 76.

The area of each of the coils 74*a* to 74*d* defined by each outer diameter is about ½ of the capacitance loading plate 721 or 722 (105 mm long side×30 mm short side) and each coil is wound by a predetermined winding pitch to be formed in a helical shape. The coils 74*a* to 74*d* are spaced about 5 to 10 mm apart from each other and provided not to be positioned in an overlapping manner.

The first FM broadcast receiving element and the second FM broadcast receiving element operate as a series resonance circuit in conjunction with the ground conductor GND. Specifically, the first FM broadcast receiving element and the second FM broadcast receiving element both resonate at a desired frequency (for example, 84 MHz) and the first FM broadcast receiving element and the second FM broadcast receiving element are designed to collectively resonate at the frequency as a series resonance circuit.

The number of coils in the sixth embodiment is twice as many as the number of coils in the first embodiment. This means that the current flowing through the first coil 74*a*, the current flowing through the second coil 74*b*, the current flowing through the third coil 74*c*, and the current flowing through the fourth coil 74*d* are each equal to ½ of the current flowing through the first coil 14*a* and the second coil 14*b* in the first embodiment. For this reason, in comparison to the case of the antenna device 1 of the first embodiment in which the antenna impedance was 0.23Ω, the antenna impedance of the antenna device 7 of the sixth embodiment was 0.86Ω which is about four times as much as the antenna impedance of the antenna device 1.

Figure 16:
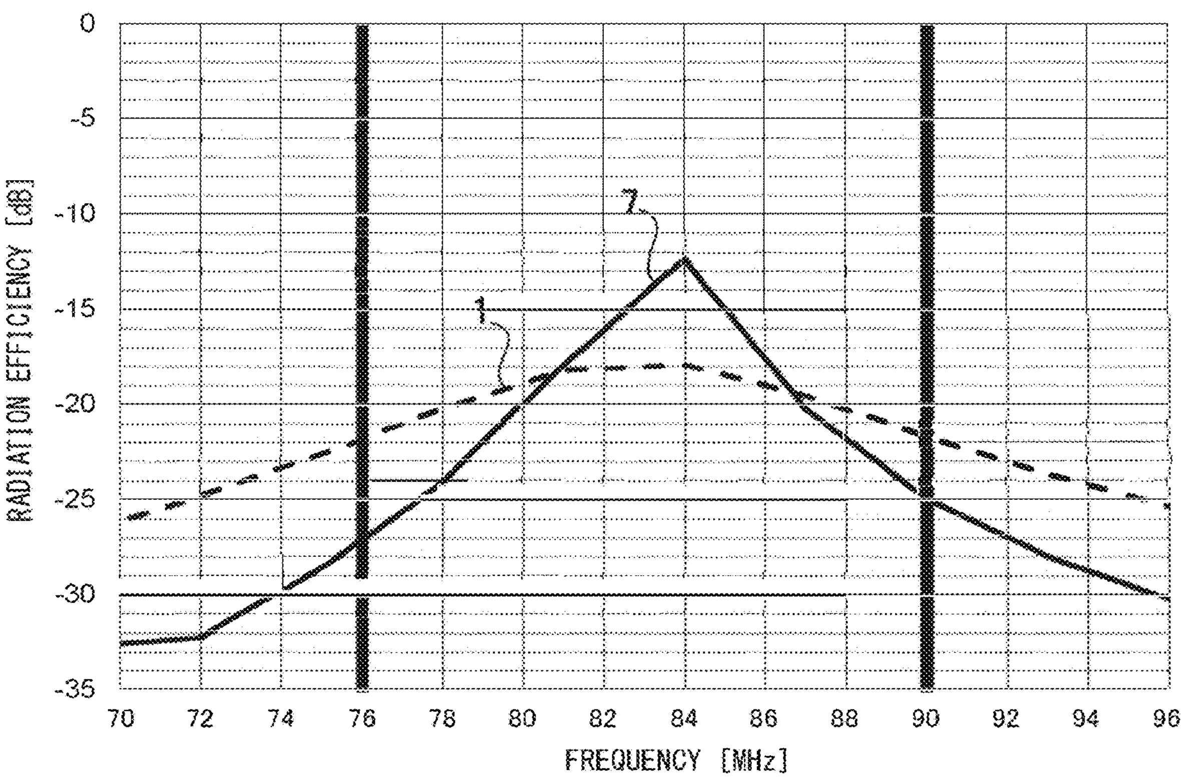
FIG. 16 is a diagram of radiation efficiency characteristic in the FM band according to the sixth embodiment.

FIG. 16 is a diagram of radiation efficiency characteristic in the FM band, in which a solid line represents the antenna device 7 of the sixth embodiment and a dashed line represents the antenna device 1 of the first embodiment. As seen from FIG. 16, the radiation efficiency characteristic of the antenna device 7 has a steep feature in comparison to the antenna device 1 and the bandwidth is narrower than that of the antenna device 1, however, the radiation efficiency at a desired frequency (84 MHz) is higher than that of the antenna device 1. In the FM band indicated between thick lines, the average radiation efficiency was −18.1 dB, which is improved in comparison to the antenna device 1. Concerning the directivity, similarly to the antenna device 1, the antenna device 7 is omnidirectional in a horizontal plane with vertical polarization in the FM band.

The sixth embodiment is the example of coupling two coils to each of the first capacitance loading plate 721 and the second capacitance loading plate 722, however, three coils may be coupled to at least one of capacitance loading plates. In this case, it is desired that a coil in the middle is wound in a direction opposite to the direction in which the other coils are wound. In addition, the ratio of winding pitches of the plurality of coils may be changed.

Seventh Embodiment

Figure 17A:
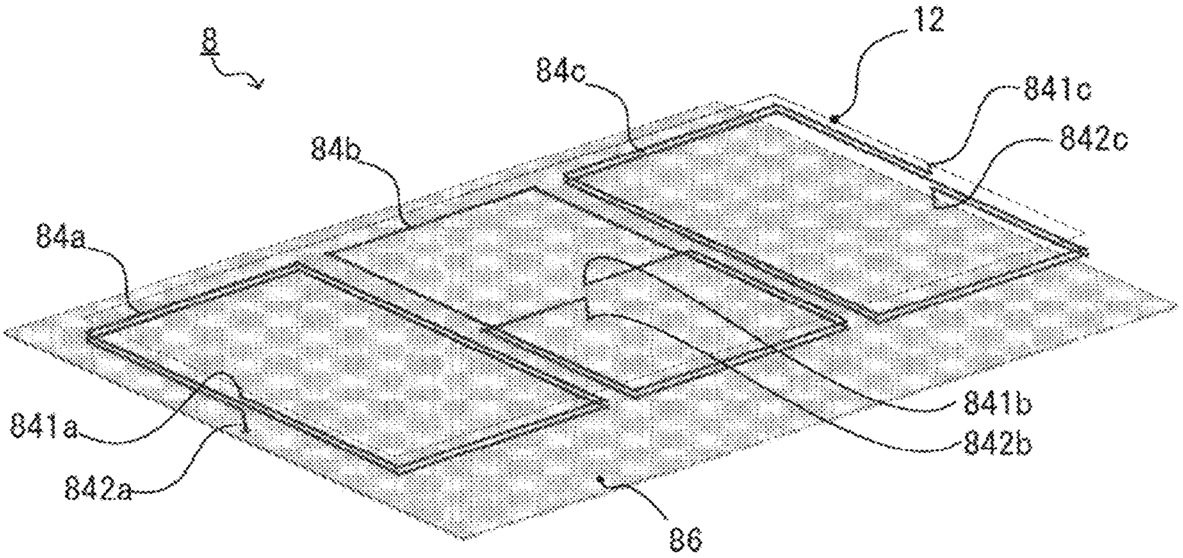
FIG. 17A is a schematic diagram of an FM broadcast receiving element according to a seventh embodiment and FIG. 17B is a simple diagram thereof.
Figure 17B:
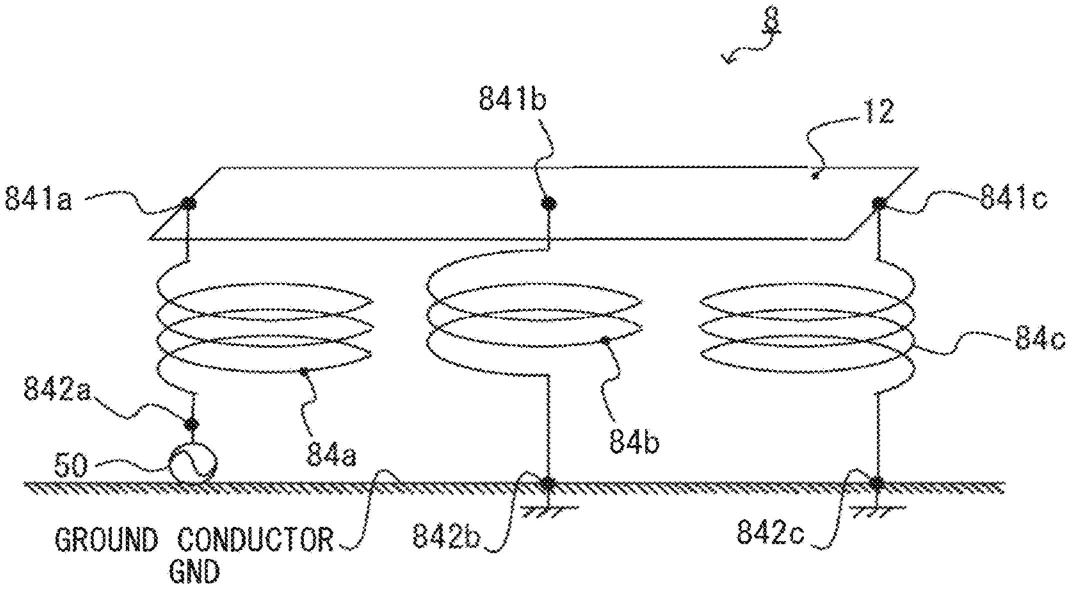

A seventh embodiment of the present invention is described. The seventh embodiment is a modified exemplary embodiment of the first embodiment and the structures of members are similar to those of the first embodiment and thus denoted by the same names and the same reference characters, and redundant descriptions thereof are omitted. FIG. 17A is a diagram schematically illustrating a structure of an FM broadcast receiving element of an antenna device 8 of the seventh embodiment and FIG. 17B is a simple diagram thereof.

An FM broadcast receiving element of the antenna device 8 of the seventh embodiment is formed such that three coils 84*a*. 84*b*, and 84*c* are provided in one direction on a single capacitance loading plate 12, in an identical plane or a substantially identical plane and the second coil 84*b* in the middle is wound in a direction opposite to the direction in which the other coils 84*a* and 84*c* are wound. For the sake of convenience, the capacitance loading plate 12 is illustrated transparently. The total area defined by the diameters of the coils 84*a*, 84*b*, and 84*c* is similar to the area of the capacitance loading plate 12 (15750 $mm^2$ (=105 mm×150 mm). This means that the size of each of the coils 84*a*, 84*b*, and 84*c* is about ⅓ of the size of the capacitance loading plate 12 (=105 mm×40 mm). The coils 84*a*, 84*b*, and 84*c* are provided not to be positioned in an overlapping manner. The height from the ground conductor GND to the capacitance loading plate 12 is similar to that of the first embodiment. A printed circuit board 86 is slightly larger in size than the capacitance loading plate 12 and formed in a rectangular shape.

One end 841*a* of the first coil 84*a* is coupled to the capacitance loading plate 12 and another end 842*a* is coupled to the feeding point 50 via a wire pattern of the printed circuit board 86. One end 841*b* of the second coil 84*b* and one end 841*c* of the third coil 84*c* are coupled to the capacitance loading plate 12 and another end 842*b* of the second coil 84*b* and another end 842*c* of the third coil 84*c* are coupled to the ground conductor GND via a GND pattern of the printed circuit board 86. The one end 841*b* of the second coil 84*b* is electrically coupled to the substantially center portion of the capacitance loading plate 12. The electrical length from the other end 842*a* of the first coil 84*a* to the other end 842*c* of the third coil 84*c* is a resonant length in the FM band, and similarly to the antenna device 1 of the first embodiment, the first coil 84*a*, the second coil 84*b*, the third coil 84*c*, and the capacitance loading plate 12 operate as a series resonance circuit in the FM band.

The antenna impedance of the antenna device 8 was 0.86Ω, which is increased in comparison to that of the antenna device 1 of the first embodiment.

Figure 18:
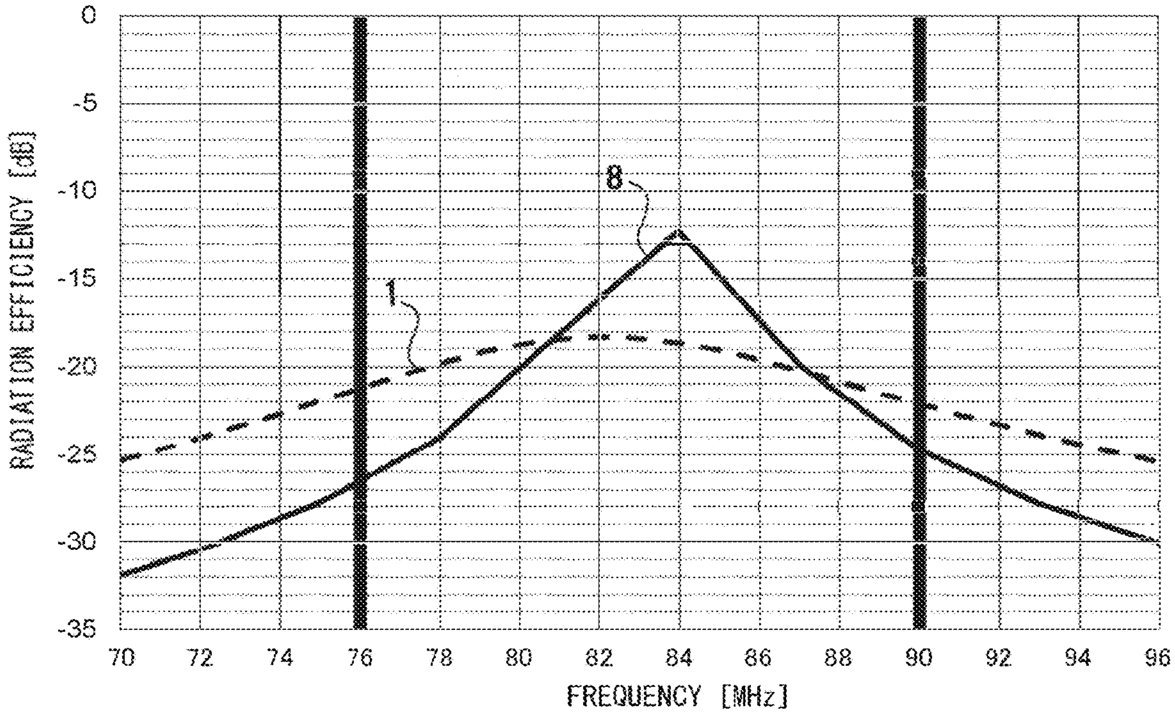
FIG. 18 is a diagram of radiation efficiency characteristic in the FM band according to the seventh embodiment.

FIG. 18 is a diagram of radiation efficiency characteristic in the FM band. A solid line represents the antenna device 8 and a dashed line represents the antenna device 1 of the first embodiment. As seen from FIG. 18, the representation of the radiation efficiency of the antenna device 8 becomes steep toward the desired frequency (84 MHz) and the radiation efficiency at the frequency is higher than that of the antenna device 1 of the first embodiment. In addition, the average gain of the radiation efficiency is improved. The average in the FM band in Japan indicated between thick lines was −18.0 dB, which is improved in comparison to the antenna device 1. Accordingly, when the number of coils coupled to a single capacitance loading plate 12, is increased, the radiation efficiency at a desired frequency in the FM band can be greatly increased.

Modified Exemplary Embodiments

While in the first to seventh embodiments the height from the ground conductor GND to the capacitance loading plate 12 or the like is approximately 10 mm, when the area of the capacitance loading plate 12 (the total area in the case of a plurality of capacitance loading plates) is substantially maintained, the radiation efficiency increases as the height from the ground conductor GND to the capacitance loading plate increases. For example, in the antenna device 1 of the first embodiment, the height from the ground conductor GND to the back surface of the capacitance loading plate 12 may be determined as 14.9 mm (the height to the outer wall of the cover portion 10 is approximately 15 mm or less). In this case, the average radiation efficiency in the FM band is −16.6 dB and the average radiation efficiency in the AM band is −67.5 dB, which are increased in comparison to the case of 10 mm (the average in the FM band is −19.6 dB and the average in the AM band is −69.9 dB).

Furthermore, the first embodiment indicates the example in which three sides of the capacitance loading plate 12 are surrounded by the outer side plate 11 along the outer periphery of the capacitance loading plate 12 and the second embodiment indicates the example in which the outer periphery of the capacitance loading plate 22 is entirely surrounded by the outer side plate 21. However, the configuration may be such that the outer side plate has a side of a length identical to the length of a side of the capacitance loading plate and is positioned with a predetermined spacing to the side of the capacitance loading plate. In this case, when the area (the height) of the outer side plate is similar to the area (the height) of, for example, the outer side plate 11 included in the antenna device 1 of the first embodiment, the radiation efficiency is not greatly changed in the case in which the shape varies. This means that the arrangement of the outer side plate can be changed in any manner depending on the shape of the cover portion 10, resulting in improved flexibility of design.

Moreover, in the above embodiments, the example of using the FM band as the VHF band is described, however, the embodiments can be applied to the cellular band (800 MHz to 900 MHz) in the same manner by only changing the size.

According to the present disclosure, a conductive plate of the first element and a conductive plate of the second element are provided in an identical plane or a substantially identical plane, and there is thus no projection. This facilitates low-profile design of the antenna element. Additionally, by coupling a plurality of reactance elements to the conductive plate of the first element, the reactance elements and the conductive plate operate as a series resonance circuit in the first frequency band, and as a result, in comparison to the case of using one reactance element, the voltage standing wave ratio (VSWR) is improved and the radiation efficiency is thus increased.

While the first embodiment describes the example in which the antenna housing is the antenna case including the cover portion 10 and the resin base portion 30, a housing space formed at any portion of a vehicle body may be used as an antenna housing instead of the antenna case that individually exists.

The invention claimed is:

1. An antenna device comprising:
- an antenna housing; and
- an antenna element which is accommodated in the antenna housing,
- wherein the antenna element includes a conductive plate positioned to cause capacitance between the conductive plate and a ground conductor and a plurality of reactance elements, each reactance element having one end coupled to the conductive plate,
- wherein the antenna element resonates in a very high frequency (VHF) band,
- wherein the plurality of reactance elements includes a first reactance element and a second reactance element,
- wherein another end of the first reactance element is coupled to a feeding point and another end of the second reactance element is coupled to the ground conductor, and
- wherein the conductive plate, the first reactance element, and the second reactance element operate as a series resonance circuit.

2. An antenna device comprising:
- an antenna housing;
- an antenna element which is accommodated in the antenna housing,
- wherein the antenna element includes a conductive plate positioned to cause capacitance between the conductive plate and a ground conductor and a plurality of reactance elements, each reactance element having one end coupled to the conductive plate, and
- wherein the antenna element resonates in a very high frequency (VHF) band;
- a holder configured to hold the plurality of reactance element; and
- a printed circuit board having the ground conductor and the feeding point,
- wherein the printed circuit board is provided below the holder.

3. An antenna device comprising:
- an antenna housing; and
- an antenna element which is accommodated in the antenna housing,
- wherein the antenna element includes a conductive plate positioned to cause capacitance between the conductive plate and a ground conductor and a plurality of reactance elements, each reactance element having one end coupled to the conductive plate,
- wherein the antenna element resonates in a very high frequency (VHF) band, and
- wherein the antenna device is attached to a roof of a vehicle.

4. The antenna device according to claim 3, further comprising:
- a prelock member for temporary fixing the antenna device when the antenna device is attached to the vehicle.

5. The antenna device according to claim 3, wherein the conductive plate is configured to load the capacitance into the antenna element.

6. The antenna device according to claim 3, wherein the conductive plate and the reactance elements operate as a series resonance circuit.

7. The antenna device according to claim 3,
- wherein the plurality of reactance elements includes a first reactance element and a second reactance; element, and
- wherein another end of the first reactance element is coupled to a feeding point and another end of the second reactance element is coupled to the ground conductor.

8. The antenna device according to claim 7,
- wherein the first reactance element includes the first coil,
- wherein the second reactance element includes the second coil, and
- wherein directions in which the first coil and the second coil are wound are opposite to each other.

9. The antenna device according to claim 7,
- wherein the first reactance element includes a first coil,
- wherein the second reactance element includes a second coil, and
- wherein a first number of turns of the first coil is greater than a second number of turns of the second coil.

10. The antenna device according to claim 7, wherein an electrical length of the first reactance element is longer than an electrical length of the second reactance element.

11. An antenna device comprising:

an antenna housing; and an antenna element which is accommodated in the antenna housing, wherein the antenna element includes a conductive plate positioned to cause capacitance between the conductive plate and a ground conductor and a plurality of reactance elements, each reactance element having one end coupled to the conductive plate, wherein the antenna element resonates in a very high frequency (VHF) band, wherein the plurality of reactance elements includes a first reactance element and a second reactance element, wherein another end of the first reactance element is coupled to a feeding point and another end of the second reactance element is coupled to the ground conductor, and wherein the first reactance element and the second reactance element are apart from each other and provided not to be positioned in an overlapping manner.

* * * * *